T. CLOUSTON.
GAS PRODUCER.
APPLICATION FILED MAY 4, 1909.
946,820.
Patented Jan. 18, 1910.
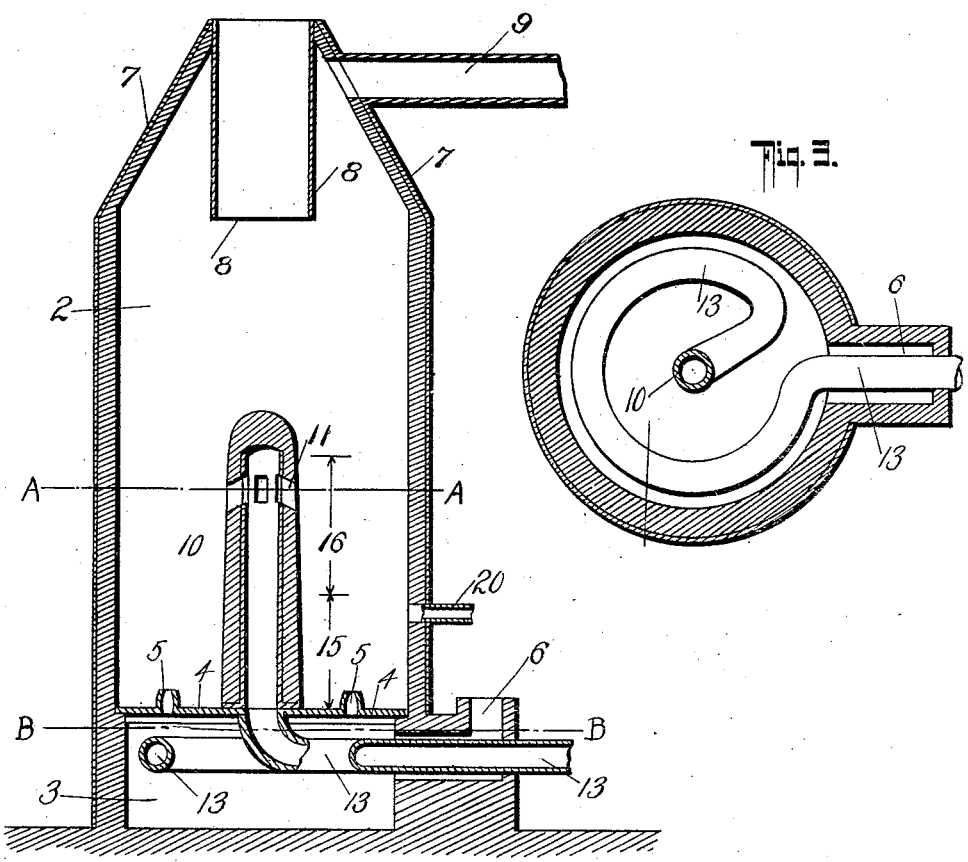
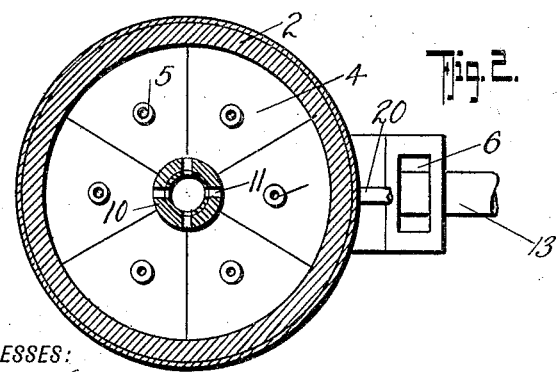
WITNESSES:
Charles H. Wagner
J. Theodore Schrott.
INVENTOR
Thomas Clouston.
BY
Fred G. Dieterich
ATTORNEY.

UNITED STATES PATENT OFFICE.

THOMAS CLOUSTON, OF VANCOUVER, BRITISH COLUMBIA, CANADA.

GAS-PRODUCER.

946,820. Specification of Letters Patent. Patented Jan. 18, 1910.

Application filed May 4, 1909. Serial No. 493,827.

*To all whom it may concern:*

Be it known that I, THOMAS CLOUSTON, a citizen of the Dominion of Canada, residing at Vancouver, in the Province of British Columbia, Canada, have invented a new and useful Improvement in Gas-Producers, of which the following is a specification.

This invention relates to a gas producer for the generation of a heating or power gas from waste products, such as wood refuse or the like, or other gas generating material, and my object has been to devise a simple and efficient producer from which the volatile vapors may be withdrawn and condensed to recover the distillates as byproducts, and which contains within itself provision by which the generated gas may be exposed to sufficient heat to render it stable.

The invention is particularly described in the following specification, reference being made to the drawings by which it is accompanied, in which:

Figure 1 is a vertical longitudinal section, Fig. 2, a sectional plan on the line A A and Fig. 3, a sectional plan on the line B B.

In these drawings 2 represents a generating chamber the form and proportions of which may be varied to suit the requirements of the material from which it is required to generate the gas. The lower part of this chamber 2 is separated from the ash pit 3 by a partition grate 4 of any desired construction as the same *per se*, forms no part of my invention, or the pit 3 made separated from the chamber 2 by a plate from which project upward a series of twyers 5 through which air admixed with a little moisture, admitted at 6, is delivered into the chamber 2. The moisture admitted with the air is evaporated to form steam as it passes to the ash pit 3 and before delivery through the twyers.

Projecting upward within the generating chamber is a gas collecting and delivery stand pipe 10 which may be protected if necessary with refractory material, fire clay or the like. This stand pipe has a closed upper end, just below which are a series of inlet apertures 11 upwardly directed slightly inward. To this stand pipe 10 is connected beneath the grate 4 a pipe 13 through which the gas is withdrawn by suction and passes through the necessary washers and scrubbers direct to the engine.

The pipe connection 13 may if found desirable expose an extended area within the ash pit as shown in Fig. 3, and may deliver through the air inlet 6, to heat the incoming air before delivery to the twyers and dispense with the necessity for a separate regenerator.

The upper part of the generating chamber 2 is directed conically inward as at 7 to the charging aperture to which a continuous feed hopper may be connected, and from the charging aperture an inner casing 8 projects downward to about the level of the base of the converging cone 7. From the annular space between the converging cone 7 and the inner casing 8, a pipe 9 delivers the volatile vapors which collect there to a condenser.

In action, the chamber 2 is charged with the material from which it is desired to generate the gas and is ignited, the charge being maintained to the upper level of the inner casing 8. Incandescence is maintained in the lower part 15 of the generator by the air delivered through the twyers 5 from the ash pit or regenerating chamber 3, which air is preheated and its moisture evaporated to form steam by contact with the pipe 13 through which the hot gases are passing as generated to the washers and scrubbers, and by contact with that pipe where it passes through the air delivery 6 to the chamber 3.

The gases for use, for heating or power purposes, are drawn from what may be called the generating strata 16 adjacent to the outlets 11 and pass downward through the central tube 10 which being surrounded at 15 by incandescent fuel is maintained at the necessary heat to render the gas fixed and stable. Above the generating strata 16, the material has its moisture and volatile vapors driven off by the heat from the strata beneath and these vapors collect in the annular space between the converging cone 7 and its inner casing 8 and pass through the pipe 9, in which a slight vacuum may be maintained, to be condensed for the recovery of the distillates as by-products. Any non-condensable gases may be withdrawn from the condenser and returned to the combustion strata 15 through a pipe 20 where they will become fixed by passage through the incandescent fuel and will be drawn through the stand pipe 10.

The downwardly projected casing 8, not only forms a space wherein the volatile vapors will collect, but will also permit a slight vacuum to be maintained in the upper part of the chamber 2, and these gases will part with their sensible heat to partially dry out the material as it is charged through 8 and before it comes under the influence of the distilling temperature to which it is exposed below that level.

What I claim is:

1. In a gas producer, the combination with a generating chamber having a partition grate toward the bottom and a charging inlet projected within the top, twyers upwardly projected through the partition grate and delivering air into the generator, means for collecting the gas generated from fuel charged into the generating chamber and for delivering the same through a passage exposed to the incandescent heat toward the lower part of the generating chamber.

2. In a gas producer, the combination with a generating chamber having a partition grate across the bottom and a charging inlet projected within the top, of means for delivering air from the space beneath the partition grate through twyers upwardly projecting from the partition, means for collecting gas generated from about the mid-height of the generating chamber and for delivering the same through a passage exposed to the heat of the incandescent fuel in the lower part of the same chamber, and means for delivering the hot gas so collected through a pipe exposed to the incoming air in the space beneath the partition grate.

3. In a gas producer, the combination with a generating chamber having a partition across the bottom separating it from an air chamber beneath and having a charging inlet projected within the top, twyers delivering air from the air chamber beneath to within the generating chamber and a central stand pipe extending toward the mid-height of the generating chamber having apertures toward its upper end and a pipe connected beneath the partition said pipe exposing a heating surface to the incoming air, said partition having upwardly projected apertured members.

4. In a gas producer, the combination with a generating chamber having a partition separating it toward the bottom from an air chamber beneath and having a charging inlet projected within the top means for heating the air in the air space beneath the partition and for delivering the same through that partition means for collecting the generated gas from approximately the mid-height of the generating chamber and for passing it downward through the incandescent fuel in the lower part of the generating chamber, means for delivering volatile vapors collecting in the space around the inwardly projected charging inlet and means for delivering non-condensable gas toward the lower end of the generating chamber.

5. In a gas producer having an internal chamber, a partition separating said chamber into an upper generating chamber and a lower air chamber, said partition having twyers for passing air from the air chamber into the generating chamber, a central standpipe extending to near the mid-height of the generating chamber and having apertures near its upper end, a suction pipe coiled in the air chamber and connected with said standpipe, an air inlet duct to said air chamber through which said suction pipe projects whereby the incoming air by contact with such suction pipe will be heated.

6. In a gas producer having an internal chamber, a partition separating said chamber into an upper generating chamber and a lower air chamber, said partition having twyers for passing air from the air chamber into the generating chamber, a central standpipe extending to near the mid-height of the generating chamber and having apertures near its upper end, a suction pipe coiled in the air chamber and connected with said standpipe, an air inlet duct to said air chamber through which said suction pipe projects whereby the incoming air by contact with said suction pipe will be heated, said gas producer having a charging opening in the top and a depending tubular member within said generating chamber communicating with said charging opening to form a trap at the top of the generating chamber, and an off-take pipe for said pipe.

7. In a gas producer having an internal chamber, a partition separating said chamber into an upper generating chamber and a lower air chamber, said partition having twyers for passing air from the air chamber into the generating chamber, a central standpipe extending to near the mid-height of the generating chamber and having apertures near its upper end, a suction pipe coiled in the air chamber and connected with said standpipe, an air inlet duct to said air chamber through which said suction pipe projects whereby the incoming air by contact with said suction pipe will be heated, said gas producer having a charging opening in the top and a depending tubular member within said generating chamber communicating with said charging opening to form a trap at the top of the generating chamber, an off-take pipe for said trap, and a second off-take pipe for said generating chamber located at a point above said partition and below the openings in said standpipe.

In testimony whereof I have signed my name to this specification in the presence of two subscribing witnesses.

THOMAS CLOUSTON.

Witnesses:
 ROWLAND BRITTAIN,
 CLIVE S. CARMAN.